(12) United States Patent
Ichikawa

(10) Patent No.: US 7,611,560 B2
(45) Date of Patent: Nov. 3, 2009

(54) METHOD OF MANUFACTURING PLUGGED HONEYCOMB STRUCTURE, AND PLUGGED HONEYCOMB STRUCTURE

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 524 days.

(21) Appl. No.: 11/341,597

(22) Filed: Jan. 30, 2006

(65) Prior Publication Data
US 2006/0185335 A1      Aug. 24, 2006

(30) Foreign Application Priority Data
Feb. 23, 2005   (JP)   ............................. 2005-047367

(51) Int. Cl.
*B01D 46/00*      (2006.01)
*F01N 3/022*      (2006.01)
(52) U.S. Cl. ...................... 55/523; 55/282.3; 55/385.3; 55/524; 55/DIG. 5; 55/DIG. 10; 55/DIG. 30; 95/273; 60/297; 60/311; 264/630; 264/631; 264/DIG. 48; 428/116; 422/180
(58) Field of Classification Search ................ 55/282.2, 55/282.3, 385.3, 523, 524, DIG. 5, DIG. 10, 55/DIG. 30; 95/273; 60/297, 311; 428/116, 428/117, 118; 264/628, 630, 631, DIG. 48; 422/180
See application file for complete search history.

(56) References Cited

U.S. PATENT DOCUMENTS

| | | | | |
|---|---|---|---|---|
| 4,427,423 A | * | 1/1984 | Montierth | ..................... 55/523 |
| 4,455,180 A | * | 6/1984 | Hillman et al. | ............. 264/631 |
| 4,568,402 A | * | 2/1986 | Ogawa et al. | ................ 501/119 |
| 4,786,542 A | * | 11/1988 | Yasuda et al. | ................ 428/116 |
| 5,183,608 A | * | 2/1993 | Guile | .................. 264/DIG. 48 |
| 5,318,755 A | * | 6/1994 | Kuivalainen et al. | ........... 55/523 |
| 5,388,345 A | * | 2/1995 | Brundage et al. | ............ 264/428 |
| 6,699,428 B2 | * | 3/2004 | Nishi et al. | .................. 264/630 |
| 6,712,884 B2 | * | 3/2004 | Bruck et al. | ................... 55/523 |
| 6,764,527 B2 | * | 7/2004 | Ishihara et al. | ................. 55/523 |
| 6,827,754 B2 | * | 12/2004 | Suwabe et al. | ................ 55/523 |

(Continued)

FOREIGN PATENT DOCUMENTS

EP       1 418 032 A2     5/2004

(Continued)

*Primary Examiner*—Jason M Greene
(74) *Attorney, Agent, or Firm*—Oliff & Berridge, PLC

(57) ABSTRACT

There is disclosed a method of manufacturing a plugged honeycomb structure, capable of simply manufacturing a plugged honeycomb structure which can avoid a phenomenon of rapid increase of pressure losses generated by cell openings clogged with particulate matters on an inlet side. The method of manufacturing the plugged honeycomb structure in the present invention includes the steps of: forming a clay into a honeycomb shape to obtain a cylindrical honeycomb formed body having a plurality of partitioned cells; preparing a plugging material so that a contraction ratio (firing contraction ratio) of the plugging material during the firing is a predetermined ratio with respect to the firing contraction ratio of the honeycomb formed body; plugging openings of predetermined cells on one end side of each cell with the plugging material to obtain a plugged honeycomb formed body; and firing this plugged honeycomb formed body in a state in which the plugged honeycomb formed body is laid on a firing setter so as to bring each end plugged with the plugging material into contact with the firing setter to obtain the plugged honeycomb structure.

13 Claims, 11 Drawing Sheets

U.S. PATENT DOCUMENTS

| | | | |
|---|---|---|---|
| 6,840,976 B2 * | 1/2005 | Vance et al. | 55/523 |
| 7,090,714 B2 * | 8/2006 | Otsubo et al. | 55/523 |
| 2004/0131772 A1 | 7/2004 | Yamada et al. | |
| 2004/0161373 A1 | 8/2004 | Ichikawa et al. | |
| 2006/0199118 A1 * | 9/2006 | Noguchi | 431/2 |

FOREIGN PATENT DOCUMENTS

| | | |
|---|---|---|
| EP | 1 450 015 A1 | 8/2004 |
| JP | A 62 97636 | 5/1987 |
| JP | A 2001-269585 | 10/2001 |
| JP | A 2004-251137 | 9/2004 |

* cited by examiner

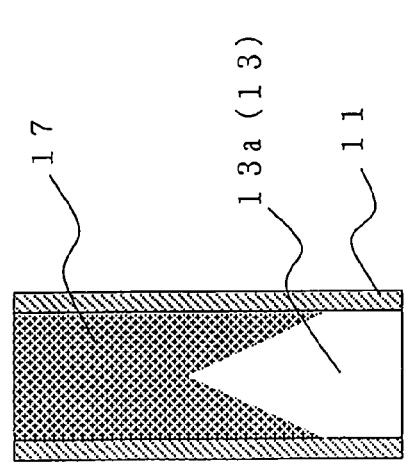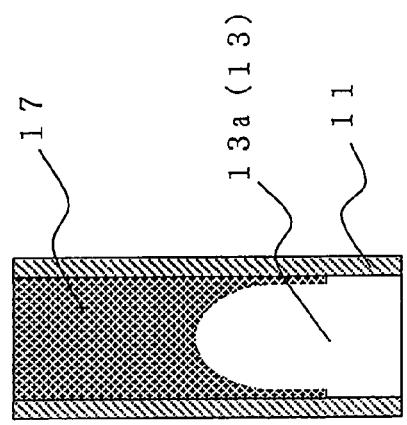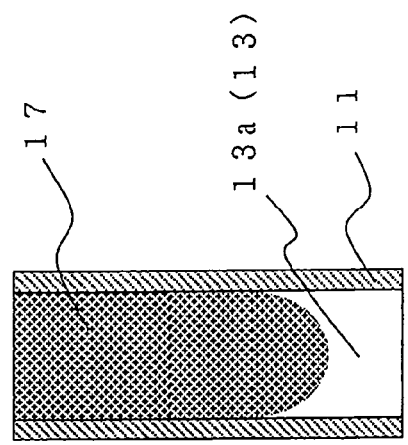

METHOD OF MANUFACTURING PLUGGED HONEYCOMB STRUCTURE, AND PLUGGED HONEYCOMB STRUCTURE

BACKGROUND OF THE INVENTION

1. Field of the Invention

The present invention relates to a plugged honeycomb structure manufacturing method, and a plugged honeycomb structure. More particularly, the present invention relates to a plugged honeycomb structure manufacturing method capable of easily manufacturing a plugged honeycomb structure which can avoid a phenomenon of rapid increase of pressure losses generated by cell openings clogged with particulate matters on an inlet side, and a plugged honeycomb structure capable of reducing pressure losses and effectively preventing clogging with a solid content which does not disappear during burning of ash, iron oxide or the like.

2. Description of the Related Art

A large amount of particulate matters mainly containing soot (carbon black smoke) are contained in an exhaust gas discharged from a diesel engine, a gasoline lean burn engine, or a gasoline direct jet engine. Since the particulate matters discharged to atmospheric air cause environmental pollution, an exhaust gas system of the diesel engine is provided with a honeycomb filter for trapping the particulate matters.

As the honeycomb filter for use in such purpose, a plugged honeycomb structure is used in which one end portion of a part of cells is plugged in one end of a honeycomb structure having a plurality of cells partitioned by porous partition walls and extending through the structure in an axial direction, and one end portion of each of remaining cells is plugged in the other end (see, e.g., Japanese Patent Application Laid-Open No. 2001-269585).

A treated gas (exhaust gas) flows into the cell whose inlet-side end is not plugged and whose outlet-side end is plugged in this plugged honeycomb structure, passes through the porous partition walls, moves into the cell whose inlet-side end is plugged and whose outlet-side end is not plugged, and is discharged from this cell. In this case, the partition wall constitutes a filtering layer, and particulate matters such as soot in the gas are trapped by the partition walls and deposited on the partition walls.

Moreover, as the honeycomb structure for trapping the particulate matters, a filter is also disclosed in which one end portion of a part of the cells is sealed in an only one end of the above-described honeycomb structure (see, e.g., Japanese Patent Application Laid-Open No. 2004-251137). When this honeycomb structure is manufactured, in order to eliminate a dimensional difference during firing, cell end portions are first filled with a material (plugging material) constituted of a ceramic or the like as a plugging portion in not one end, but opposite ends of the honeycomb structure, and the structure is fired so that a contraction amount during the firing becomes appropriately equal in opposite ends. After the firing, the plugging portions of the cells in one end are removed to thereby obtain the honeycomb structure. Alternatively, it has been proposed that a honeycomb formed body having a length which is not less than twice a necessary length be obtained, and plugged in the same manner as in the above-described method. After the formed body is further fired, the resultant fired article is cut in the center to thereby obtain two halves.

However, in the plugged honeycomb structure described in Japanese Patent Application Laid-Open No. 2001-269585, since the openings of all the cells on one end side are plugged, there is a problem that there are many pressure losses.

Moreover, when a diesel particulate filter (DPF) for use in purifying the exhaust gas of the diesel engine is used, the trapped particulate matters are gradually deposited in the filter. When they are left to stand, a filtering performance degrades. Therefore, when the particulate matters are deposited to a certain degree, the filter is heated or treated otherwise to burn and remove the deposited particulate matters, and a filter function is regenerated. However, in a case where the conventional plugged honeycomb structure is used, there has been a problem that a solid content which does not disappear by the burning of ash, iron oxide or the like is gradually deposited, and the structure is easily clogged. Furthermore, in the inlet-side end, there has been a problem that the particulate matters stick to a portion provided with a plugging member, the particulate matters are gradually deposited from the portion as a starting point to plug the openings of the cells on an inlet side, and therefore the pressure losses of the plugged honeycomb structure rapidly increase.

Moreover, in the honeycomb filter in which one end portion of each of a part of the cells is plugged in the only one end of the honeycomb structure, there is used a honeycomb structure which has heretofore been used. Since such honeycomb structure generally has such a shape that the pressure losses are reduced by enlarging a filtering area of the porous partition wall, a ratio (length/outer diameter) of a length of the honeycomb structure in an axial direction to an outer diameter of the honeycomb structure is 0.9 or more. Therefore, there has been a problem that the length of the resultant honeycomb filter in the axial direction comparatively increases, and an installation space is wasted.

Moreover, as a method of manufacturing such honeycomb filter, there is disclosed a method of removing the plugging portions of the cells in one end after the firing. However, in such manufacturing method, there is a problem that the removed plugging portions in one end are wasted, and costs increase. In a case where the honeycomb filter is manufactured by a method of cutting the fired article in the center to obtain two halves, it is necessary to form, dry, plug, and then fire the honeycomb structure having a length which is not less than twice the length of the final honeycomb structure. Specifically, for example, when a dimension of a final product indicates a diameter of 191 mm and a length of 203 mm as one dimension of a standard honeycomb structure, an elongated article having a diameter of 191 mm and a length of 406 mm is obtained. When the elongated article is fired in a state in which the opposite ends are plugged, it becomes very difficult to discharge a forming binder from the honeycomb formed body, and therefore a sophisticated firing control technology is required. Since a firing time is set to be very long, there is also a problem that a firing capability degrades, and the costs increase.

SUMMARY OF THE INVENTION

The present invention has been developed in view of such conventional situations, and there is provided a honeycomb structure manufacturing method capable of easily manufacturing a plugged honeycomb structure which can avoid a phenomenon of rapid increase of pressure losses generated by cell openings clogged with particulate matters on an inlet side. There is also provided a plugged honeycomb structure capable of reducing pressure losses and effectively preventing clogging with a solid content which does not disappear during burning of ash, iron oxide or the like.

The present invention provides the following plugged honeycomb structure manufacturing method and plugged honeycomb structure.

[1] A method (hereinafter sometimes referred to as "first invention") of manufacturing a plugged honeycomb structure comprising a cylindrical honeycomb structure having porous partition walls and a plurality of cells partitioned by the partition walls and extending through the structure from one end to the other end thereof, and plugging members which plug portions of predetermined cells having a predetermined length from one end of each cell, the opposite ends of the remaining cells being open without being plugged, the method comprising the steps of: forming a clay including a forming material into a honeycomb shape to obtain a cylindrical honeycomb formed body having a plurality of partitioned cells extending through the formed body from one end to the other end thereof; preparing a plugging material of the plugging members so that a contraction ratio (firing contraction ratio) of the plugging material during the firing is a predetermined ratio with respect to the firing contraction ratio of the honeycomb formed body; plugging openings of the predetermined cells of the resultant honeycomb formed body on one end side with the plugging material to obtain a plugged honeycomb formed body; and firing the resultant plugged honeycomb formed body in a state in which the plugged honeycomb formed body is laid on a firing setter so as to bring each end plugged with the plugging material into contact with the firing setter to thereby obtain the plugged honeycomb structure.

[2] The method of manufacturing the plugged honeycomb structure according to the above [1], wherein the plugging material is prepared so that the ratio of the firing contraction ratio of the plugging material with respect to the firing contraction ratio of the honeycomb formed body is in a range of 0.70 to 1.30.

[3] The method of manufacturing the plugged honeycomb structure according to the above [1] or [2], wherein the honeycomb formed body is cut and divided into a predetermined length, before plugging the predetermined cells of the honeycomb formed body.

[4] A method (hereinafter sometimes referred to as "second invention") of manufacturing a plugged honeycomb structure comprising a cylindrical honeycomb structure having porous partition walls and a plurality of cells partitioned by the partition walls and extending through the structure from one end to the other end thereof, and plugging members which plug portions of predetermined cells having a predetermined length from one end of each cell, the opposite ends of the remaining cells being open without being plugged, the method comprising the steps of: forming a clay including a forming material into a honeycomb shape to obtain a cylindrical honeycomb formed body having a plurality of partitioned cells extending through the formed body from one end to the other end thereof; firing the resultant honeycomb formed body to obtain the honeycomb structure; preparing a plugging material of the plugging members so that a contraction ratio (firing contraction ratio) of the plugging material during the firing is a predetermined ratio with respect to the firing contraction ratio of the honeycomb structure; plugging openings of the predetermined cells of the resultant honeycomb structure on one end side with the plugging material to obtain a plugged honeycomb precursor; and firing the resultant plugged honeycomb precursor in a state in which the plugged honeycomb precursor is laid on a firing setter so as to bring each end plugged with the plugging material into contact with the firing setter to thereby obtain the plugged honeycomb structure.

[5] The method of manufacturing the plugged honeycomb structure according to the above [4], wherein the plugging material is prepared so that the ratio of the firing contraction ratio of the plugging material with respect to the firing contraction ratio of the honeycomb 'structure is in a range of 0.70 to 1.30.

[6] The method of manufacturing the plugged honeycomb structure according to the above [4] or [5], wherein the honeycomb structure is cut and divided into a predetermined length, before plugging the predetermined cells of the honeycomb structure.

[7] The method of manufacturing the plugged honeycomb structure according to any one of the above [1] to [6], wherein the firing setter is used which is constituted of the same material as that of the honeycomb formed body.

[8] The method of manufacturing the plugged honeycomb structure according to any one of the above [1] to [7], wherein the honeycomb formed body is formed so that a ratio (length/outer diameter) of a length of the honeycomb formed body in an axial direction with respect to the outer diameter of the honeycomb formed body is in a range of 0.1 to 0.8.

[9] A plugged honeycomb structure (hereinafter sometimes referred to as the third invention) comprising: a cylindrical honeycomb structure having porous partition walls and a plurality of partitioned cells extending through the structure from one end to the other end thereof; and plugging members which plug portions of predetermined cells having a predetermined length from one end of each cell, the opposite ends of the remaining cells being open without being plugged, the plugged honeycomb structure being constituted so that a ratio (length/outer diameter) of a length of the honeycomb structure in an axial direction with respect to the outer diameter of the cylindrical honeycomb structure is in a range of 0.1 to 0.8.

[10] The plugged honeycomb structure according to the above [9], wherein the ratio of the length of the honeycomb structure in the axial direction with respect to the outer diameter of the cylindrical honeycomb structure is in a range of 0.1 to 0.6.

[11] The plugged honeycomb structure according to the above [9] or [10], wherein a recessed portion is formed in the surface of the plugging member.

According to the method of manufacturing the plugged honeycomb structure of the present invention, it is possible to simply manufacture the plugged honeycomb structure capable of avoiding a phenomenon of rapid increase of pressure losses generated by cell openings clogged with particulate matters on an inlet side. According to the plugged honeycomb structure of the present invention, pressure losses are reduced, and it is possible to effectively prevent clogging with a solid content which does not disappear during burning of ash, iron oxide or the like.

BRIEF DESCRIPTION OF THE DRAWINGS

FIG. 5(a) is a schematic sectional view schematically showing one example of a plugging material which plugs a predetermined cell in one embodiment of the method of manufacturing the plugged honeycomb structure in the present invention (first invention);

FIG. 5(b) is a schematic sectional view schematically showing another example of the plugging material which plugs the predetermined cell in one embodiment of the method of manufacturing the plugged honeycomb structure in the present invention (first invention);

FIG. 5(c) is a schematic sectional view schematically showing still another example of the plugging material which plugs the predetermined cell in one embodiment of the method of manufacturing the plugged honeycomb structure in the present invention (first invention);

DESCRIPTION OF THE PREFERRED EMBODIMENT

There will be described hereinafter a method of manufacturing a plugged honeycomb structure of the present invention, and an embodiment of a plugged honeycomb structure in detail with reference to the drawings. The present invention is not restrictively interpreted, and can be variously altered, modified, or improved based on knowledge of a person skilled in the art without departing from the scope of the present invention.

Figure 1A:
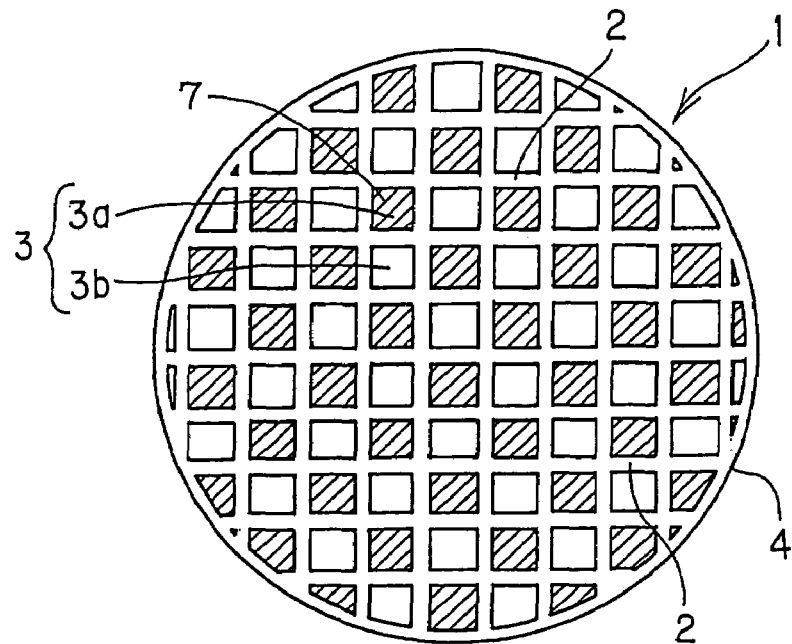
FIG. 1(a) is a plan view of a plugged honeycomb structure viewed from one end side, the structure being manufactured by one embodiment of a method of manufacturing the plugged honeycomb structure in the present invention (first invention)
Figure 1B:
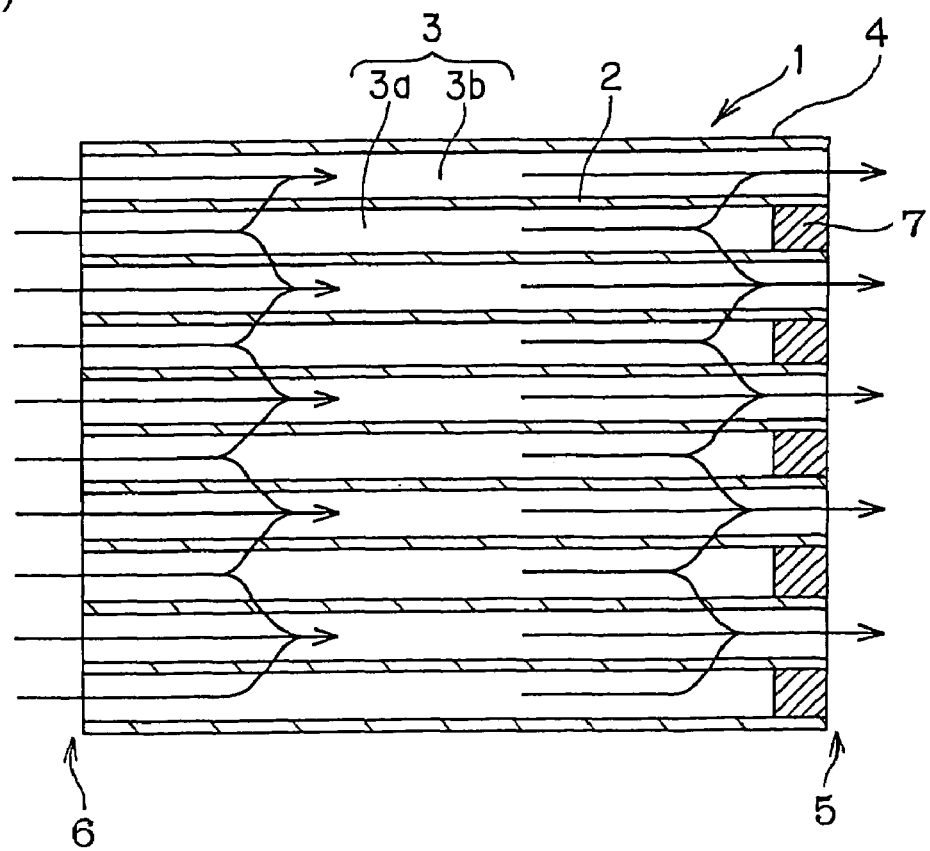
FIG. 1(b) is a schematic sectional view schematically showing a section of the plugged honeycomb structure shown in FIG. 1(a)
Figure 2:
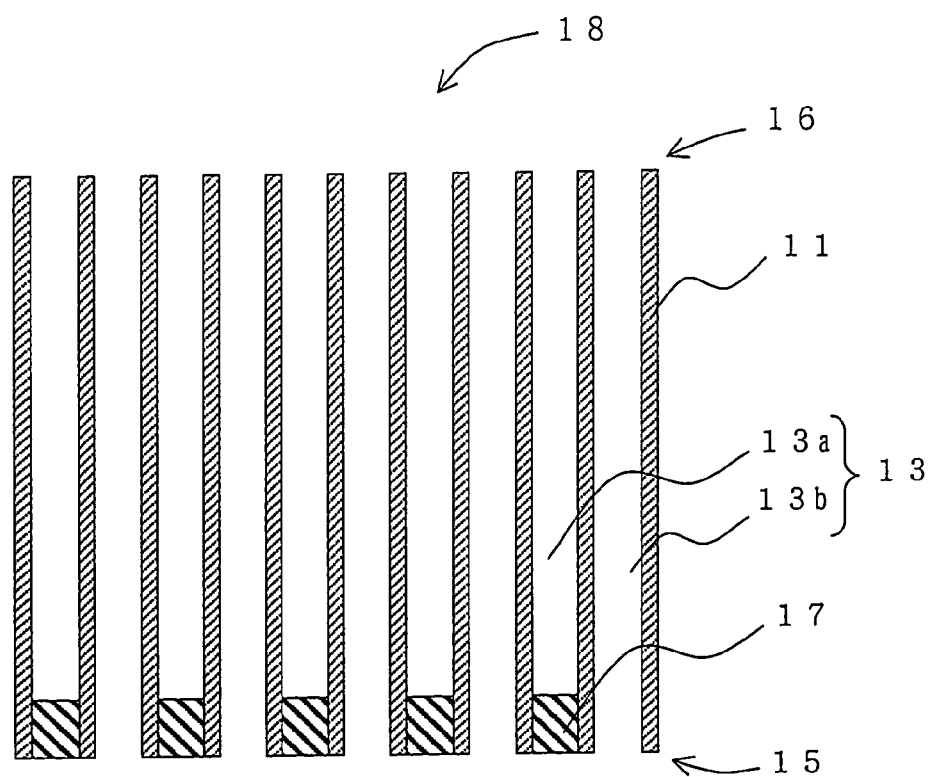
FIG. 2 is an explanatory view showing a process of preparing a plugged honeycomb formed body in one embodiment of the method of manufacturing the plugged honeycomb structure in the present invention (first invention)
Figure 3:
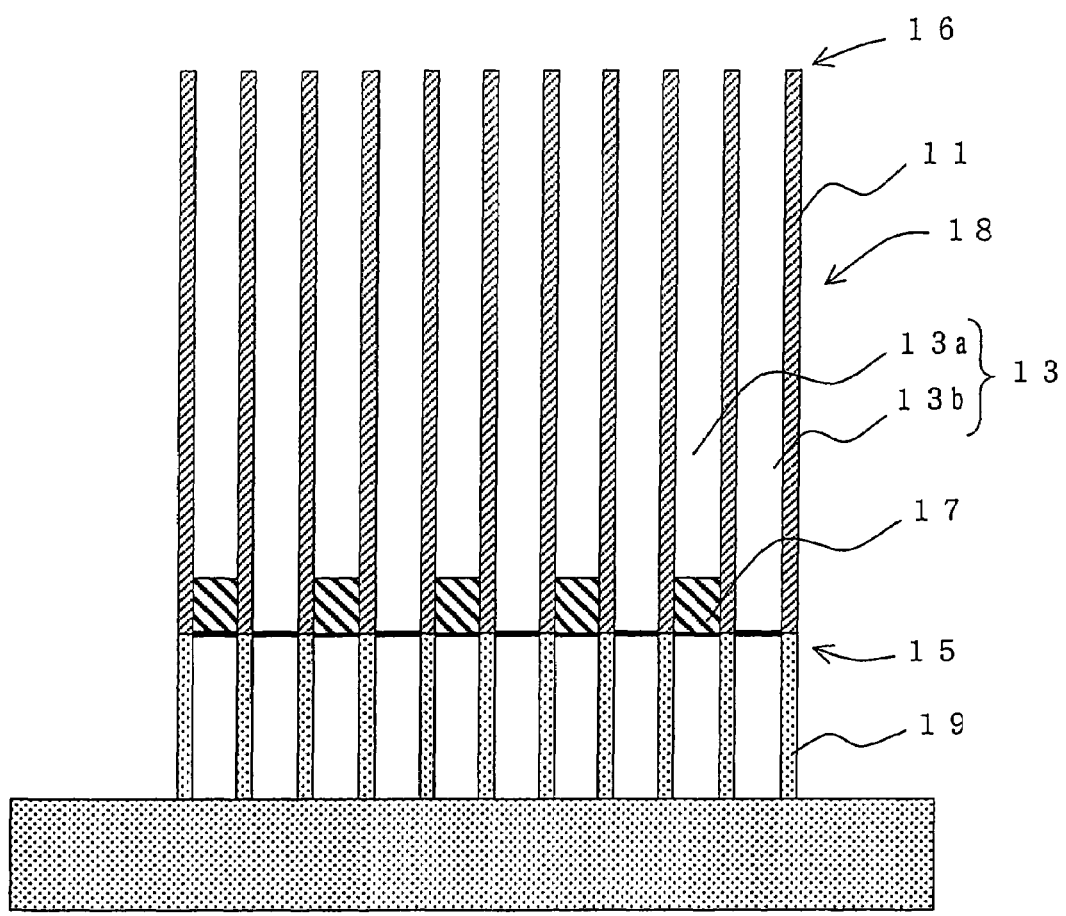
FIG. 3 is an explanatory view showing a process of firing the plugged honeycomb formed body in one embodiment of the method of manufacturing the plugged honeycomb structure in the present invention (first invention)

First, there will be specifically described one embodiment of the method of manufacturing the plugged honeycomb structure in the present invention. FIG. 1(a) is a plan view of a plugged honeycomb structure manufactured by the method of manufacturing the plugged honeycomb structure in the present embodiment, viewed from one end side, and FIG. 1(b) is a schematic sectional view schematically showing (a section of the plugged honeycomb structure shown in FIG. 1(a). FIG. 2 is an explanatory view showing a process of preparing a plugged honeycomb formed body in the method of manufacturing the plugged honeycomb structure in the present embodiment, and FIG. 3 is an explanatory view showing a process of firing the plugged honeycomb formed body in the method of manufacturing the plugged honeycomb structure in the present embodiment. The method of manufacturing the plugged honeycomb structure in the present embodiment is a method of manufacturing a plugged honeycomb structure 1, as shown in FIGS. 1(a) and 1(b), provided with: a cylindrical honeycomb structure 4 having porous partition walls 2 and a plurality of cells 3 partitioned by the partition walls 2 and extending through the structure from one end 5 to the other end 6; and plugging members 7 which plug portions (end portions) of predetermined cells 3a having a predetermined length from one end 5 of each cell. The opposite ends 5, 6 of remaining cells 3b are open without being plugged. This plugged honeycomb structure 1 has an advantage that pressure losses can be reduced more than before owing to the presence of the cells 3b which open without plugging the opposite ends 5, 6. When the structure is used as a filter, the structure is useful in an application in which a trapping efficiency of a single filter unit is not very strictly required. As to solid matters such as ash and iron oxide that remain without disappearing after burning and removing particulate matters deposited in the plugged honeycomb structure 1, the solid matters remaining in the cells 3b opened without plugging the opposite ends 5, 6 are discharged to the outside by means of pressure of a gas passed through the cells 3b. Therefore, the cells 3 are not easily clogged with the solid matters.

The method of manufacturing the plugged honeycomb structure of the present embodiment includes the steps of: first forming a clay including a forming material into a honeycomb shape to obtain a cylindrical honeycomb formed body 11 having a plurality of partitioned cells 13 extending through the formed body from one end 15 to the other end 16; preparing a plugging material 17 of the plugging members 7 so that a contraction ratio (firing contraction ratio) of the plugging material 17 during the firing is a predetermined ratio with respect to the firing contraction ratio of the honeycomb formed body 11; plugging openings of predetermined cells 13a of the resultant honeycomb formed body 11 on one end 15 side with the plugging material 17 to obtain a plugged honeycomb formed body 18; and firing the resultant plugged honeycomb formed body 18 in a state in which the plugged honeycomb formed body is laid on a firing setter so as to bring each end (one end 15 in FIG. 3) of the formed body plugged with the plugging material 17 into contact with the firing setter 19 as shown in FIG. 3 to thereby obtain the plugged honeycomb structure 1 shown in FIG. 1(b).

Figure 4:
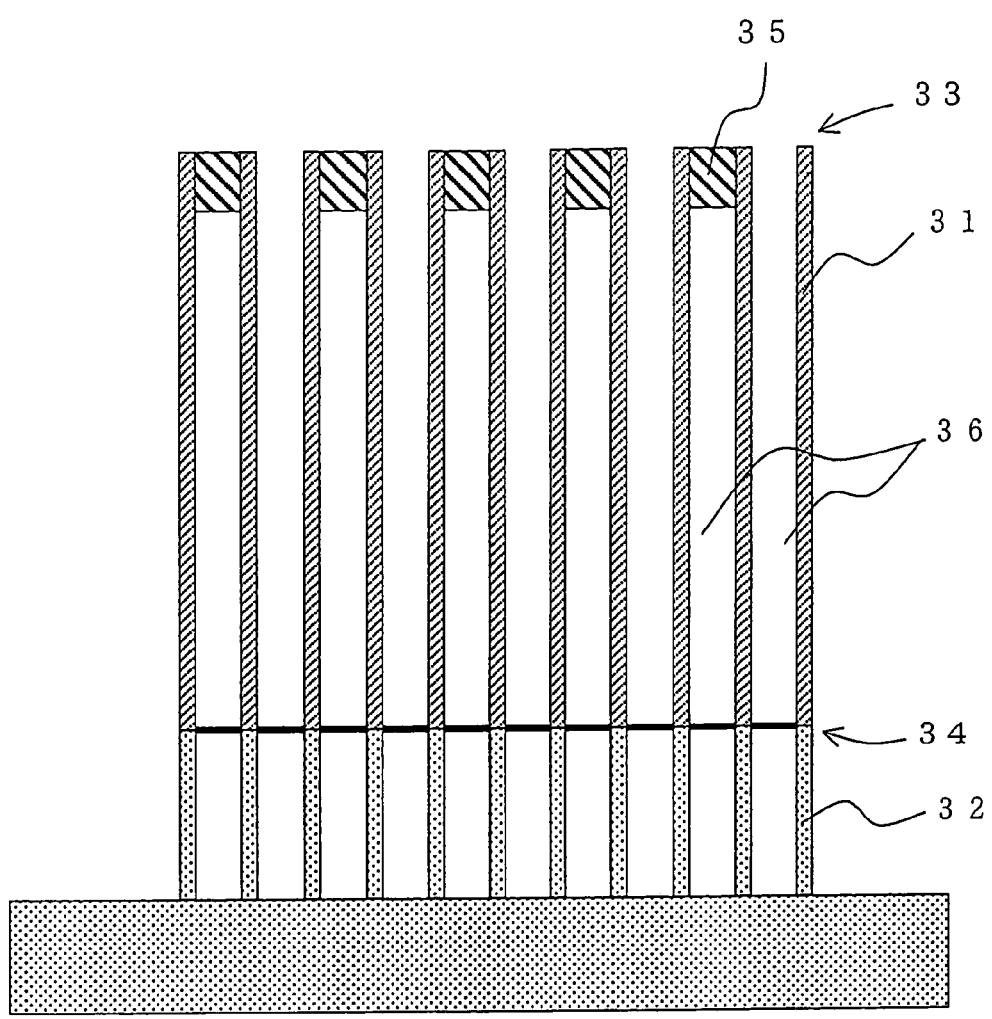
FIG. 4 is an explanatory view showing a process of firing a plugged honeycomb formed body in a conventional method of manufacturing a plugged honeycomb structure.
Figure 5D:
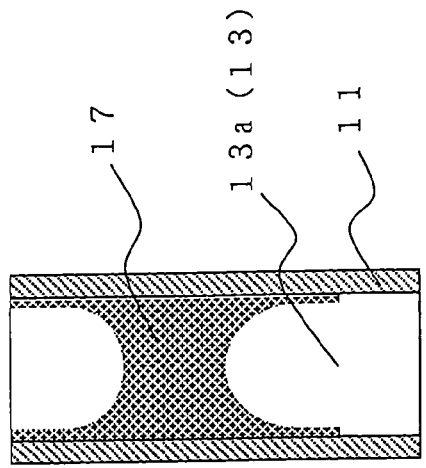
FIG. 5(d) is a schematic sectional view schematically showing a further example of the plugging material which plugs the predetermined cell in one embodiment of the method of manufacturing the plugged honeycomb structure in the present invention (first invention)
Figure 5E:
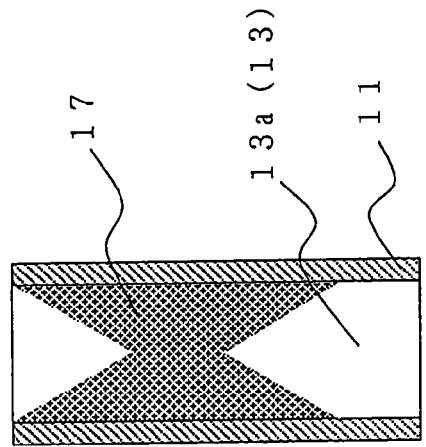
FIG. 5(e) is a schematic sectional view schematically showing a further example of the plugging material which plugs the predetermined cell in one embodiment of the method of manufacturing the plugged honeycomb structure in the present invention (first invention)
Figure 5F:
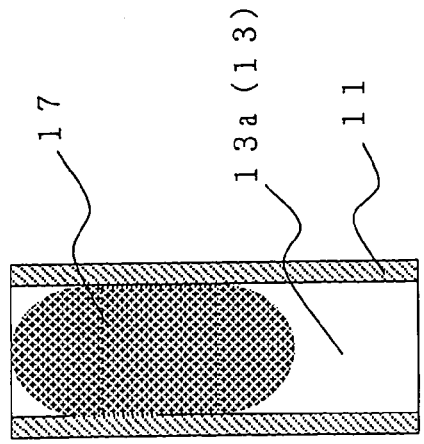
FIG. 5(f) is a schematic sectional view schematically showing a further example of the plugging material which plugs the predetermined cell in one embodiment of the method of manufacturing the plugged honeycomb structure in the present invention (first invention)
Figure 5G:
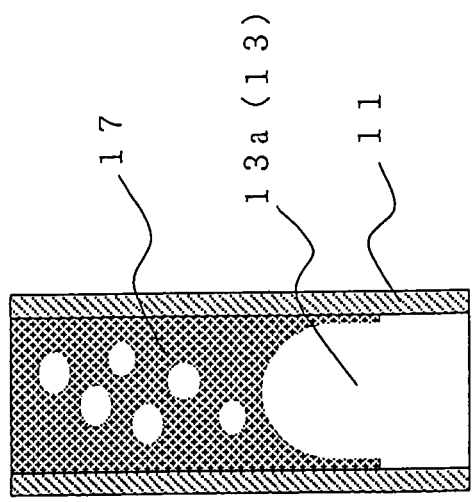
FIG. 5(g) is a schematic sectional view schematically showing a further example of the plugging material which plugs the predetermined cell in one embodiment of the method of manufacturing the plugged honeycomb structure in the present invention (first invention)
Figure 5H:
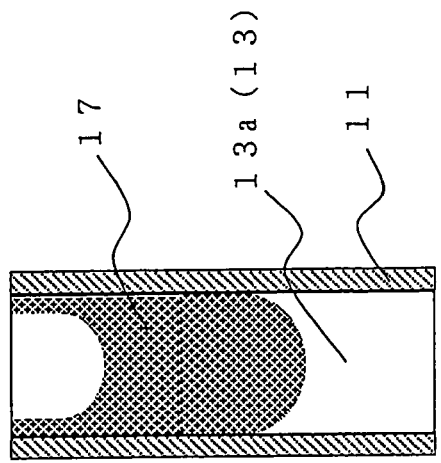
FIG. 5(h) is a schematic sectional view schematically showing a further example of the plugging material which plugs the predetermined cell in one embodiment of the method of manufacturing the plugged honeycomb structure in the present invention (first invention)
Figure 5I:
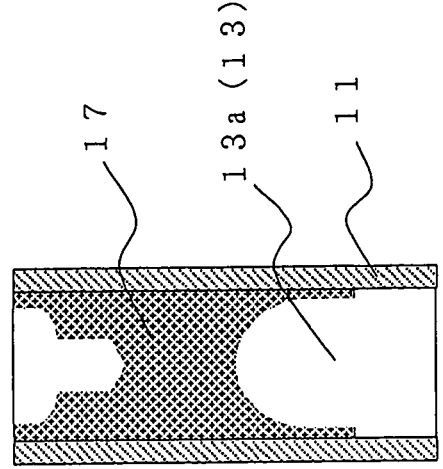
FIG. 5(i) is a schematic sectional view schematically showing a further example of the plugging material which plugs the predetermined cell in one embodiment of the method of manufacturing the plugged honeycomb structure in the present invention (first invention)
Figure 5J:
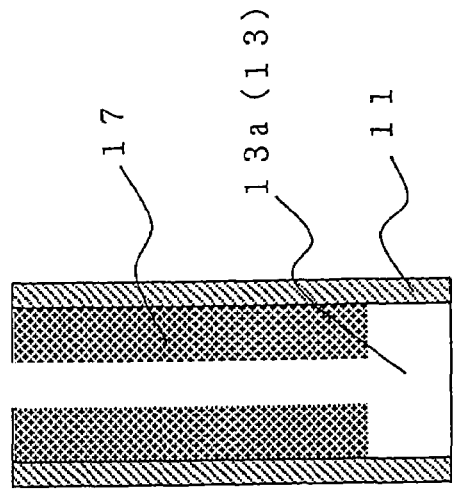
FIG. 5(j) is a schematic sectional view schematically showing a further example of the plugging material which plugs the predetermined cell in one embodiment of the method of manufacturing the plugged honeycomb structure in the present invention (first invention)
Figure 5K:
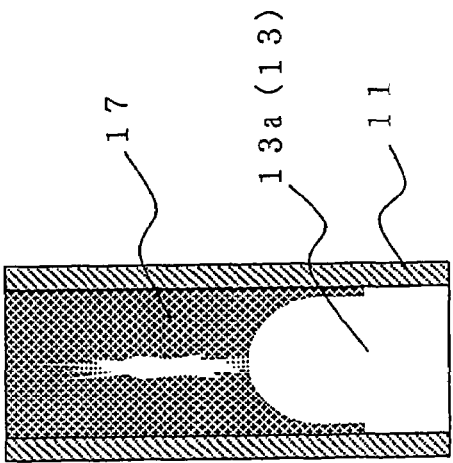
FIG. 5(k) is a schematic sectional view schematically showing a further example of the plugging material which plugs the predetermined cell in one embodiment of the method of manufacturing the plugged honeycomb structure in the present invention (first invention)
Figure 5L:
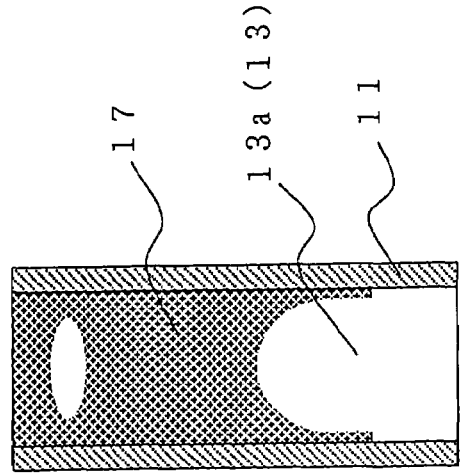
FIG. 5(l) is a schematic sectional view schematically showing a still further example of the plugging material which plugs the predetermined cell in one embodiment of the method of manufacturing the plugged honeycomb structure in the present invention (first invention)

As a conventional method of manufacturing a plugged honeycomb structure, a method is simple in which a plugging material including a ceramic or the like forming a plugging member is formed into a slurry or paste, end portions of predetermined cells are filled with the material in one end of a honeycomb formed body prepared by extrusion forming or the like, and the formed body is fired. However, when the formed body is fired after plugging cell ends in one end of the formed body in this manner, there is a problem that a difference is made in firing contraction or expansion between the end on a side including the plugged cells and the end on a side on which the cells are not plugged, and product defects such as distortion, deformation, and crack are easily generated by losing a balance of the contraction/expansion. Heretofore, as shown in FIG. 4, predetermined cells 36 of a honeycomb formed body 31 on one end 33 side are provided with a plugging material 35 forming plugging members. The formed body is disposed on a firing setter 32 constituted of a thin honeycomb structure that is not plugged in a state in which the end 33 plugged with the plugging material 35 is turned upwards, and the formed body is fired while a temperature rise or fall speed especially at 1200° C. or more is delayed very much. In this conventional manufacturing method, an end 34 which is not provided with the plugging material 35 is brought into contact with the firing setter 32 which is not provided with the plugging material 35. Accordingly, it is assumed that each firing contraction ratio in this contact face is set to be approximately equal, and it is possible to avoid the crack caused by the contraction difference during the firing. However, in such conventional manufacturing method, after the firing, a difference is made in an outer diameter dimension between the one end 33 plugged with the plugging material 35 and the end 34 which is not provided with the plugging material 35. Moreover, flatness of the ends 33, 34 is disadvantageously deteriorated owing to this dimensional difference. As an example of a cause for this, the honeycomb formed body 31 is influenced by firing contraction or expansion of the plugging material 35.

In the method of manufacturing the plugged honeycomb structure in the present embodiment, as shown in FIG. 3, the formed body is fired in a state in which the formed body is laid so as to bring the end 15 plugged with the plugging material 17 into contact with the firing setter 19. The plugging material has been prepared so that the firing contraction ratio is a predetermined ratio with respect to the firing contraction ratio of the honeycomb formed body 11. Therefore, a dimensional change of the end 15 plugged with the plugging material 17 is rectified utilizing a firing dimensional change of the firing setter 19, and the plugged honeycomb structure 1 (see FIG. 1(b)) having a desired shape can be easily manufactured.

Moreover, in the conventional manufacturing method shown in FIG. 4, temperature of the plugging material 35 and that in the vicinity of the end 33 of the honeycomb formed body 31 plugged with the plugging material 35 do not easily follow atmospheric temperature in a firing furnace, and unevenness is easily generated in the firing. This is supposedly because thermal capacity of the plugging material 35 is large. Moreover, since the openings of the cells 36 are plugged with the plugging material 35, the cells 36 plugged with the plugging material 35 are shut off from the atmosphere in the firing furnace. In the method of manufacturing the plugged honeycomb structure in the present embodiment, as shown in FIG. 3, since the formed body is laid so as to bring the end 15 plugged with the plugging material 17 into contact with the firing setter 19, the end 16 that is not provided with the plugging material 17 necessarily opens to the atmosphere in the firing furnace. The temperature of the end 16 easily follow the atmospheric temperature in the firing furnace, uniform firing is realized, and a firing time can be shortened.

It is to be noted that it will be supplementarily described that the honeycomb formed body 31 is influenced by the firing contraction or expansion of the plugging material 35 during the firing in the conventional manufacturing method shown in FIG. 4. For example, assuming that the firing contraction ratio of the honeycomb formed body 31 is 1, that is, assuming that there is not finally any dimensional change due to the firing and that the firing contraction ratio of the plugging material 35 is larger than 1, the plugging material 35 causes a dimensional contraction due to the firing, and the end 33 of the honeycomb formed body 31 plugged with the plugging material 35 is influenced by the dimensional contraction of the plugging material 35 to cause the dimensional contraction. On the other hand, the end 34 on the side which is not provided with the plugging material 35 is not influenced by the dimensional contraction of the plugging material 35, and therefore the dimensional change is not caused. As a result, when the honeycomb formed body 31 plugged with the plugging material 35 is fired, the outer diameter dimension in the vicinity of the end 33 on the side provided with the plugging material 35 becomes smaller than that on the end 34 side which is not provided with the plugging material 35. When a difference of the firing contraction ratio between the honeycomb formed body 31 and the plugging material 35 increases, a dimensional difference also increases, and finally a firing crack is sometimes generated. It has been found that in a case where a standard plugged honeycomb structure (e.g., diameter of 191 mm, length of 203 mm) is manufactured using the conventional method of manufacturing the plugged honeycomb structure shown in FIG. 4, when the difference of the firing contraction ratio exceeds 10%, a portion provided with the plugging material 35 is frequently cracked.

Furthermore, in the method of manufacturing the plugged honeycomb structure in the present embodiment shown in FIGS. 2 and 3, in a case where the honeycomb formed body 11 is long in the axial direction and is cylindrical, since the end 16 on the side that is not provided with any plugging material 17 is opened, a forming binder included in the honeycomb formed body 11 is decomposed. It becomes comparatively easy to discharge the binder to the outside (atmosphere in the firing furnace), and a binder removing time during the firing is shortened as compared with the conventional manufacturing method.

There will be described hereinafter the method of manufacturing the plugged honeycomb structure in the present embodiment in more detail. First, to form the honeycomb formed body 11 shown in FIG. 2, a porous material as a forming material is kneaded to obtain a clay. From viewpoints of strength, heat resistance and the like, preferable examples of the porous material include: one type of ceramic material such as cordierite, alumina, mullite, lithium aluminum silicate, aluminum titanate, titania, zirconia, silicon nitride, aluminum nitride, silicon carbide, or lithium aluminum silicate (LAS), or a compound of them; stainless steel; an aluminum alloy; and one type of adsorption material such as active carbon, silica gel, or zeolite.

As the clay for forming the honeycomb formed body 11, usually, about 10 to 40 parts by mass of water is added to 100 parts by mass of mixed material powder including the above-described main material (porous material) and an additive added if necessary, and the material is kneaded to obtain a plastic mixture.

Next, this clay is formed into a honeycomb shape to obtain the honeycomb formed body 11. A method of forming the clay can be performed in conformity with the conventional method of manufacturing the plugged honeycomb structure. For example, there can be performed an extrusion forming method, an injection forming method, a press forming method, a method of forming the clay into a columnar shape before forming through holes, or the like. However, the extrusion forming method is preferable in that continuous forming is easy, a cordierite crystal is oriented, and a thermal expansion property can be lowered. The extrusion forming may be performed in any of a lateral (horizontal) direction, a vertical (perpendicular) direction, and an oblique direction. Such extrusion forming can be realized using a vacuum clay kneader, a ram type extrusion former or the like.

In the method of manufacturing the plugged honeycomb structure in the present embodiment, there is not any special restriction on a sectional shape (cell shape) of the cell 13 of the honeycomb formed body 11 to be formed, but from a viewpoint during production, the sectional shape is preferably one of a triangular shape, a quadrangular shape, a hexagonal shape, and a circular shape. There is not any special restriction on the sectional shape of the honeycomb formed body 11, and any shape can be formed such as an elliptical shape, an elongated circular shape, an oval shape, a substantially triangular shape, or a polygonal shape such as a substantially quadrangular shape in addition to the circular shape. These shapes may be used alone or combined. When the resultant plugged honeycomb structure 1 (see FIG. 1(*b*)) is used as the filter, a cell structure is preferably provided with thin walls and high cell density in order to cover a trapping performance drop by the cells 3*b* (see FIG. 1(*b*)) whose opposite ends 5, 6 (see FIG. 1(*b*)) are open. Heretofore, there has been used a cell structure having a thickness of the partition wall in a range of 10 to 30 mil (0.25 to 0.76 mm) and a cell density in a range of 7.8 to 54.3 cells/mm$^2$ (50 to 350 cells/square inch), such as a cell structure having a partition wall thickness (rib thickness) of 25 mil (0.64 mm) and a cell density of 15.5 cells/mm$^2$ (100 cells/square inch) (cell pitch of 2.54 mm in a square cell), a cell structure having a partition wall thickness of 17 mil (0.43 mm) and a cell density of 15.5 cells/mm$^2$ (100 cells/square inch) (cell pitch of 2.54 mm in a square cell), or a cell structure having a partition wall thickness of 12 mil (0.30 mm) and a cell density of 46.5 cells/mm$^2$ (300 cells/square inch) (cell pitch of 1.47 mm in a square cell). The cell structure is provided with the thin walls and the high cell density, that is, the partition wall thickness is set to 10 mil (0.25 mm) or less, preferably 8 mil (0.20 mm) or less, and the cell density is set to 54.3 cells/mm$^2$ (350 cells/square inch) or more, preferably 62.0 cells/mm$^2$ (400 cells/square inch) or more. In this case, a partition wall surface area which comes into an exhaust gas increases. Therefore, a particulate matter trapping performance can be improved.

Moreover, when the honeycomb formed body 11 is obtained in the method of manufacturing the plugged honeycomb structure in the present embodiment, the formed body may be formed into a length corresponding to that the plugged honeycomb structure 1 (see FIG. 1(*b*)) to be manufactured. Alternatively, the formed body may be formed into a cylindrical shape which is longer than the plugged honeycomb structure 1 (see FIG. 1(*b*)) to be manufactured, and the resultant honeycomb formed body 11 may be cut and divided into a predetermined length. When the formed honeycomb formed body 11 is cut and divided into the predetermined length, a plurality of honeycomb formed bodies 11 can be obtained by performing the forming once.

In the method of manufacturing the plugged honeycomb structure of the present embodiment, there is not any special restriction on a size of the honeycomb formed body 11 to be formed, but the formed body is formed so that a ratio (length/outer diameter) of the length of the honeycomb formed body 11 in the axial direction with respect to the outer diameter of the honeycomb formed body 11 is preferably 0.1 to 0.8, more preferably 0.1 to 0.6. In the conventional plugged honeycomb structure in which either of the end portions of each cell is plugged with the plugging member, in order to increase a filtering area of the partition wall and reduce pressure losses, the ratio (length/outer diameter) of the length of the honeycomb structure in the axial direction with respect to the outer diameter of the honeycomb structure is set to 0.9 or more. However, the method of manufacturing the plugged honeycomb structure of the present embodiment is a method of manufacturing the plugged honeycomb structure 1 provided with the cell 3*a* whose one end 5 is plugged and the cell 3*b* whose opposite end portions open without being plugged in a mixed state, and having an essentially low pressure loss. Therefore, even when the above-described ratio is set to be low (0.1 to 0.8, more preferably 0.1 to 0.6), there is not any special problem in the pressure loss.

Moreover, although not shown, sizes of the openings of the cells may be varied, when the honeycomb formed body is formed. When the sizes of the openings of the cells are varied, the cell having a comparatively large-area opening is provided with the plugging material, and the cell having a comparatively small-area opening is not provided with any plugging material. In this case, a fluid (e.g., exhaust gas) can be easily allowed to flow into the cell whose opening is plugged with the plugging member in the resultant plugged honeycomb structure. A resistance to air flow in the cell can be adjusted by disposing a particulate and/or fibrous filler in the cell which is not provided with at least the plugging material, forming a protruding substance on the partition wall surface of the honeycomb formed body, by setting surface roughness of the partition wall to be coarse, or by bending the partition wall itself.

Furthermore, the resultant plugged honeycomb structure is provided with a high porosity and a small pore diameter, that is, when the porosity is set to 70% or more, preferably 75% or more, and an average pore diameter is set to 15 μm or less, preferably 10 μm or less. When the porosity is set to be high and the pore diameter is set to be small, irregularities on the partition wall surface entirely increase, and therefore the particulate matter trapping performance can be improved. Therefore, the honeycomb formed body 11 may be formed using a forming material provided with the above-described porosity and average pore diameter when fired. A pore distribution is preferably set to be as sharp as possible. The pore diameter is set to be small and the distribution is set to be sharp to thereby improve the performance for trapping the particulate matters, especially nano-particles. This is effective in trapping by not only the inside but also the surface of the partition wall. Therefore, the trapping performance is improved even in the cell which is not plugged. This is because fine uniform irregularities are formed on the partition wall surface owing to the pores. When the pore diameter is set to be small, and the distribution is set to be sharp, the strength is preferably improved. Since a sharpness degree of the distribution can be quantified in various expressions, there is not any special restriction on the degree. When the thin walls are formed and the porosity is set to be high, the partition wall strength drops, and erosion might be caused by solid foreign matters in the exhaust gas in the end of the plugged honeycomb structure on the inlet side. Therefore, the mechanical strength of the end on the inlet side may be increased using a conventional known method.

Next, the resultant honeycomb formed body 11 is dried. Means for drying this honeycomb formed body 11 can be performed by various methods, but the formed body is preferably dried by microwave drying, hot-air drying, or a combined method of dielectric drying and hot-air drying. As another method, for example, a special method can be applied such as freezing drying, drying under reduced pressure, vacuum drying, or infrared ray drying. Next, the opposite ends of the dried honeycomb formed body 11 are cut into predetermined lengths.

The honeycomb formed body 11 is obtained in this manner, whereas the plugging material 17 for plugging the opening of the predetermined cell 13a is prepared so that the firing contraction ratio of this plugging material 17 indicates a predetermined ratio with respect to that of the honeycomb formed body 11. As the plugging material 17, a material is preferably usable which is obtained by adding water, binder, dispersant or the like to a raw material (plugging material) such as a ceramic material and forming a slurry material of about 200 dPa·s. It is to be noted that to prepare the plugging material 17 so that the firing contraction ratio of the material indicates the predetermined ratio with respect to that of the honeycomb formed body 11, in the subsequent firing step (see FIG. 3), the formed body is fired while it is laid so as to bring the end 15 of the plugged honeycomb formed body 18 on the side provided with the plugging material 17 into contact with the firing setter 19. In this case, blend of the plugging material 17 is adjusted so as to prevent the end 15 from being cracked or broken otherwise, thereby realizing the preparing of the plugging material. It is to be noted that the slurry plugging material 17 obtained in this manner is stored in a predetermined storage container.

In the method of manufacturing the plugged honeycomb structure in the present embodiment, there is not any special restriction on a typical ratio of the firing contraction ratio of the plugging material 17 with respect to that of the honeycomb formed body 11, but the ratio of the firing contraction ratio of the plugging material 17 with respect to that of the honeycomb formed body 11 is preferably 0.70 to 1.30.

As to a raw material constituting the plugging material 17, a forming material for forming the above-described honeycomb formed body 11 is preferably usable. The raw material constituting the plugging material 17 does not have to be necessarily the same as the forming material of the honeycomb formed body 11. However, since the firing contraction ratios of both of the materials agree with each other, the same material is preferably used. Preferable examples of the raw material include a cordierite ceramic material having superior heat resistance and low thermal expansion. For example, the material preferably contains: 0 to 20% by mass of kaolin having an average particle diameter of 1 to 20 µm; 37 to 40% by mass of talc having an average particle diameter of 5 to 60 µm; 15 to 45% by mass of aluminum hydroxide having an average particle diameter of 0.5 to 20 µm; 0 to 15% by mass of aluminum oxide having an average particle diameter of 1 to 20 µm; and 10 to 20% by mass of molten silica or quartz having an average particle diameter of 1 to 200 µm because a difference of the firing contraction ratio from the honeycomb formed body is small. In order to match and adjust the firing contraction ratios of the material and the honeycomb formed body, the above-described blend ratios of the raw materials and the material particle diameters are changed within predetermined ranges while maintaining a cordierite composition. The actually produced honeycomb formed body is fired beforehand, the firing contraction ratio is measured beforehand, and the blend ratios of the raw materials and the material particle diameters of the plugging material 17 are adjusted so as to match the firing contraction ratio of the material with that of the resultant honeycomb formed body. Mainly the silica material is adjusted. When an appropriate amount of the above-described pore former is added to the plugging material 17, the firing. contraction ratio of the plugging material 17 can be adjusted while adjusting the porosity of the plugging material. First, the firing contraction ratio is adjusted on a try-and-error basis, but the firing contraction ratio can be predicted by increasing actual achievements.

Next, each opening of the predetermined cell 13a on one end 15 side of the honeycomb formed body 11 is plugged with the plugging material 17 to obtain the plugged honeycomb formed body 18. As a method of disposing the plugging material 17, first a film is disposed on the end 15 of the honeycomb formed body in a masking sub-step. As this film, a polyester film is usable. An adhesive is applied to one surface of the film, and the film is attached to the end 15 of the honeycomb formed body 11. Next, a portion of the end 15 of the honeycomb formed body 11 provided with the polyester film, corresponding to the opening of each of the predetermined cells 13a, is formed into, for example, a zigzag hole with an NC scannable laser device. Since the film is molten when making the hole, a periphery of the made hole is raised.

Next, the honeycomb formed body 11 to which the film provided with this zigzag hole has been attached is forced into the storage container in which the above-described plugging material 17 is stored, and the cell 13a is filled with the plugging material 17 from the storage container via the film hole. After disposing a predetermined amount of the plugging material 17, the honeycomb formed body 11 is taken out of the storage container. The plugged honeycomb formed body 18 can be obtained in this manner.

The plugging material 17 may be disposed in a zigzag form in one end 15. For example, the plugging material may be concentrated in a predetermined region, although not shown. In one end, the plugging material may be disposed in rows, a concentric form, or a radial form. Various patterns are possible. The cells of the honeycomb formed body on an outer peripheral side may be all plugged to prevent corner portions from being chipped. In this case, the opposite ends may be plugged with the plugging material 17, or either end may be only plugged with the plugging material.

It is to be noted that in a case where the honeycomb formed body 11 is plugged with the plugging material 17 as shown in FIG. 2, even when the same material as that of the honeycomb formed body 11 is used in the plugging material 17, the firing contraction ratio does not necessarily become equal during the actual firing. For example, this is supposedly because material particles of the honeycomb formed body 11 obtained by the extrusion forming of the forming material are oriented, there is a difference between the thickness of each partition wall of the honeycomb formed body 11 and the dimension of each plugging material 17, or each plugging material 17 largely contracts during the drying. Therefore, in the method of manufacturing the plugged honeycomb structure of the present embodiment, the blend ratios of the raw materials and the material particle sizes are appropriately adjusted beforehand, and the respective firing contraction ratios are set to appropriate values. In the usual plugged honeycomb structure, an outer periphery of the structure is worked to newly form an outer wall. Therefore, there is a certain degree of tolerable range in the difference of the firing contraction ratio between the honeycomb formed body 11 and the plugging material 17. In the method of manufacturing the plugged honeycomb structure in the present embodiment, in a case where the firing contraction ratio of the honeycomb formed body 11 is larger than 1, that is, in a firing contraction system, the firing contraction ratio of the plugging material 17 is preferably set to be larger than 1. When the firing contraction ratio of the honeycomb formed body 11 is less than 1, that is, in a firing expansion system, the firing contraction ratio of the plugging material 17 is preferably set to be less than 1.

Moreover, when the heat capacity of the plugging material 17 is set to be low, the temperature difference is not easily made during the firing, and more uniform firing can be realized in the following firing step. Examples of a method of setting the heat capacity of the plugging material 17 to be low include a method of reducing a length of the plugging material 17 in a filling direction or setting the porosity of the plugging material 17 to be high. The length of the plugging material 17 in the filling direction is set to preferably 5 mm or less, more preferably 3 mm or less. It is to be noted that when the reducing of the length is combined with the setting of the high porosity of the plugging material 17, a higher effect can be obtained.

Moreover, as another method of setting the heat capacity of the plugging material 17 to be low, as shown in FIGS. 5(a) to 5(l), a dent may be formed in each filled plugging material 17, or a hollow or a void may be formed in the filled plugging material 17. It is to be noted that FIGS. 5(a) to 5(l) are schematic sectional views schematically showing the plugging material which plugs the predetermined cell in the method of manufacturing the plugged honeycomb structure in the present embodiment.

When the dent is formed in each plugging material 17, as shown in FIGS. 5(e) to 5(h), the dents are preferably formed in the opposite end portions of each plugging material 17. The opposite dents may have any shape as long as a volume of the plugging material 17 can be decreased. As a method, a water content in the slurry constituting the plugging material 17 is increased, and a kink phenomenon caused after filling the cell 13a with the slurry can be utilized. When the cell 13a is filled with the plugging material 17 in a high-viscosity state, the void can be formed between the plugging material 17 and the partition wall of the honeycomb formed body 11.

When the hollow or the void is formed in each plugging material 17, as shown in FIGS. 5(i) to 5(l), the hollows or the voids having volumes larger than those of pores formed by the porous material or the pore former included in the porous material are formed in the plugging material 17. When the plugging material 17 is used in a state in which bubbles are generated in the slurry constituting the plugging material, such hollows or voids can be easily formed. After the kink phenomenon occurs, the slurry may be charged again. The hollows or voids may have any shape as long as it is possible to secure a volume which can contribute to the low heat capacity of the plugging material 17. The methods of setting the low heat capacity of the plugging material 17 may be used alone or combined. To achieve the low heat capacity, a hole (through hole) extending through the opposite ends of the plugging material 17 may be formed. According to such constitution, for example, when the resultant plugged honeycomb structure 1 (see FIG. 1(b)) is used as a filter, a fluid such as the exhaust gas can pass through the plugging material 17, and this can contribute to the reduction of the pressure losses. Such through hole may be formed in the vicinity of the center of the plugging material 17, and may be formed as a gap between the plugging material and the partition wall of the honeycomb formed body 11.

Next, in order to dry the plugging material 17, hot air (e.g., 120° C.) is applied to the end 15 of the honeycomb formed body 11 on the side provided with the plugging material 17 to dry the material for about 5 minutes without removing the film. The driving can be performed with a hot-air blower, a hot plate, an infrared drier or the like. The plugged honeycomb formed body 18 is obtained in this manner.

Next, as shown in FIG. 3, the resultant plugged honeycomb formed body 18 is fired in a state in which the formed body is laid on the firing setter 19 having a predetermined shape so as to bring the end (one end 15 in FIG. 3) plugged with the plugging material 17 into contact with the firing setter 19. There is not any special restriction on a type of firing setter 19, and a conventional known firing setter may be used, but it is preferable to use the firing setter 19 obtained by cutting thin the honeycomb formed body of the same material or the same forming lot in the method of manufacturing the plugged honeycomb structure in the present embodiment. It is to be noted that in a case where the firing setter 19 obtained by cutting thin the honeycomb formed body of the same material or the same forming lot is used, the slurry plugging member (not shown) constituted of the same raw material as the plugging material 17 may be disposed in each opening of the cell of the firing setter 19. However, from a viewpoint of manufacturing cost reduction, it is preferable to use the firing setter 19 having a simple honeycomb shape.

As a firing method, a single kiln or a continuous furnace such as a tunnel is preferably usable. There is not any special restriction on a temperature rise speed and a cooling speed, and the speed can be appropriately selected depending on the size or the like of the plugged honeycomb formed body to be fired. It is to be noted that appropriate temperature-rise and cooling speeds are required for homogenizing a temperature distribution in the plugged honeycomb formed body to be fired and realizing uniform firing contraction and cooling contraction, and they are very important elements in the method of manufacturing the plugged honeycomb structure in the present embodiment.

The plugged honeycomb structure 1 shown in FIG. 1(b) can be easily manufactured with a high precision in this manner.

It is to be noted that in the method of manufacturing the plugged honeycomb structure in the present embodiment, after firing the plugged honeycomb formed body, the surfaces of the partition walls 2 of the honeycomb structure 4 and/or the surfaces of the pores in the partition walls 2 may carry, as catalyst components, noble metals such as platinum (Pt), rhodium (Rh), or palladium (Pd), or non-noble metals such as copper, titania, vanadium, zeolite, or perovskite-based catalyst. Accordingly, it is possible to obtain the plugged honeycomb structure capable of treating toxic components such as hydrocarbons (HC), carbon monoxide (CO) and nitrogen oxides (NOx) in the exhaust gas or promoting the burning to remove the particulate matters deposited in the filter.

Next, there will be described one embodiment of a method of manufacturing a plugged honeycomb structure in the present invention (second invention). In the same manner as in the embodiment of the first invention, the method of manufacturing the plugged honeycomb structure in the present embodiment is a method of manufacturing a plugged honeycomb structure 1, as shown in FIGS. 1(a) and 1(b), provided with: a cylindrical honeycomb structure 4 having porous partition walls 2 and a plurality of cells 3 partitioned by the partition walls 2 and extending through the structure from one end 5 to the other end 6; and plugging members 7 which plug portions (end portions) of predetermined cells 3a having a predetermined length from one end 5 of each cell. The opposite ends 5, 6 of remaining cells 3b are open without being plugged.

Figure 6:
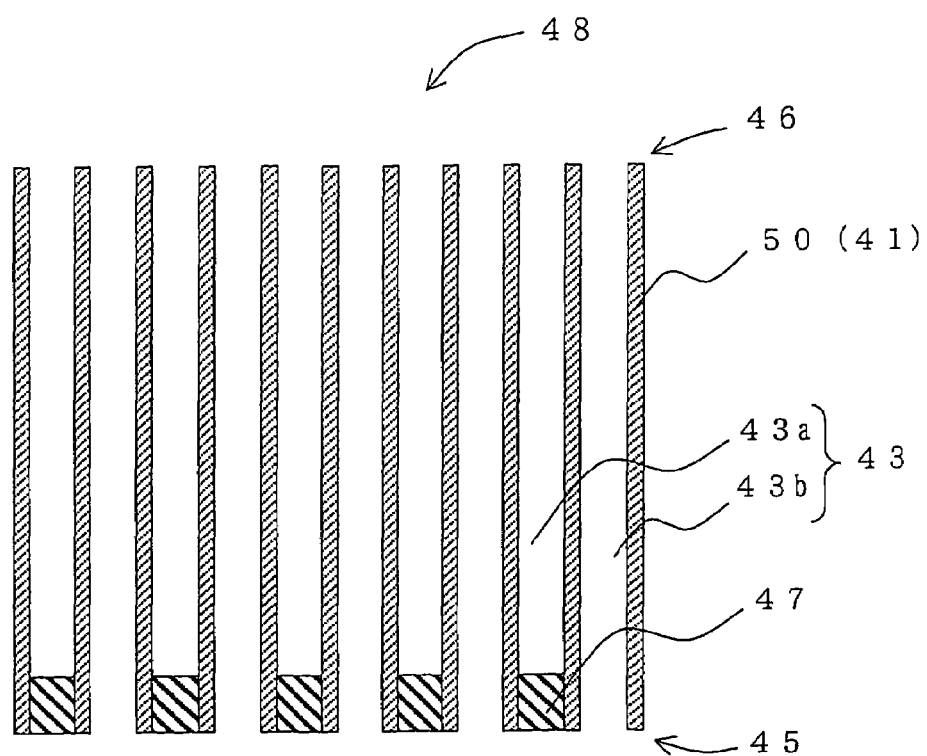
FIG. 6 is an explanatory view showing a process of preparing a plugged honeycomb formed body in one embodiment of a method of manufacturing a plugged honeycomb structure in the present invention (second invention)
Figure 7:
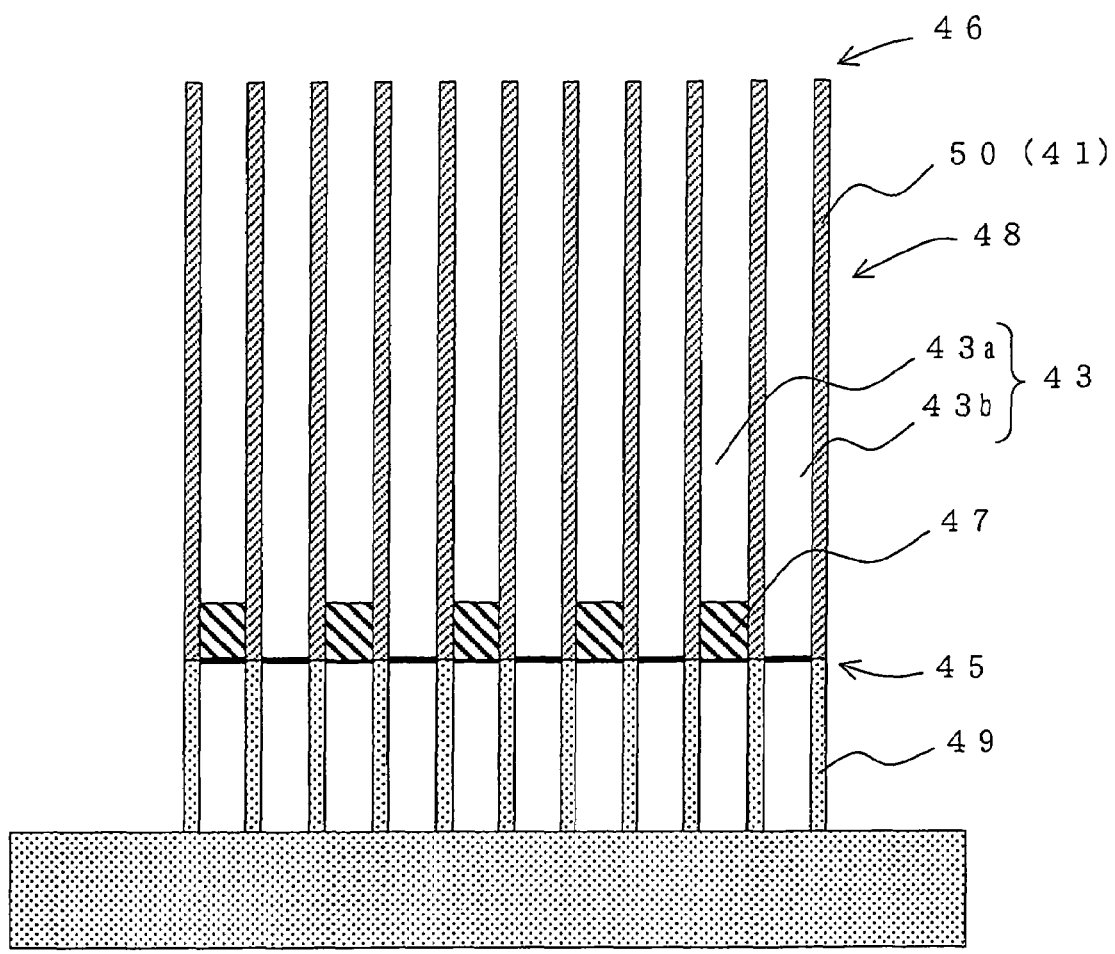
FIG. 7 is an explanatory view showing a process of firing the plugged honeycomb formed body in one embodiment of the method of manufacturing the plugged honeycomb structure in the present invention (second invention)

The method of manufacturing the plugged honeycomb structure in the present embodiment is a method of manufacturing a plugged honeycomb structure includes the steps of: forming a clay including a forming material into a honeycomb shape to obtain a cylindrical honeycomb formed body 41 having a plurality of partitioned cells 43 extending through the formed body from one end 45 to the other end 46 as shown in FIG. 6; firing the resultant honeycomb formed body 41 to obtain a honeycomb structure 50; preparing a plugging material 47 of plugging members 7 (see FIG. 1(b)) so that a contraction ratio (firing contraction ratio) of the plugging material 47 during the firing is a predetermined ratio with respect to the firing contraction ratio of the honeycomb structure 50; plugging openings of predetermined cells 43a of the resultant honeycomb structure 50 on one end 45 side with the plugging material 47 to obtain a plugged honeycomb precursor 48; and firing the resultant plugged honeycomb precursor 48 in a state in which the plugged honeycomb precursor is laid on a firing setter 49 so as to bring the end (one end 45 in FIG. 7) of the precursor plugged with the plugging material 47 into contact with the firing setter 49 as shown in FIG. 7 to obtain the plugged honeycomb structure 1 (see FIG. 1(b)).

As described above, in the method of manufacturing the plugged honeycomb structure in the present embodiment, unlike the embodiment of the first invention, first the resultant honeycomb formed body 41 is once fired to obtain the honeycomb structure 50. On the other hand, the plugging material 47 constituting the plugging member 7 (see FIG. 1(b)) is prepared so that the firing contraction ratio of the plugging material 47 indicates the predetermined ratio with respect to that of the honeycomb structure 50. The opening of each predetermined cell 43a of the once fired honeycomb structure 50 on one end 45 side is plugged with the plugging material 47 to obtain the plugged honeycomb precursor 48. It is to be noted that in the method of manufacturing the plugged honeycomb structure in the present embodiment, a method of forming the honeycomb formed body 41, and a method of firing the formed body in a state in which the formed body is disposed so that the end on the side provided with the plugging material 47 comes into contact with the firing setter 49 can be realized by methods substantially similar to those of the embodiment of the first invention.

In the method of manufacturing the plugged honeycomb structure in the present embodiment, after once firing the honeycomb formed body 41, the plugging material 47 is disposed, and the plugged honeycomb precursor 48 is fired again. Therefore, a dimensional change of the honeycomb structure 50 is very small during the firing in a case where the plugging material 47 is disposed, and the firing contraction ratio can be regarded substantially as 1. This can reduce mismatches of the firing contraction ratios of the plugged honeycomb precursor 48 and the plugging material 47. Especially, since the honeycomb structure 50 is already fired, the honeycomb structure 50 is not formed integrally with the plugging material 47, and the firing contraction ratio of the plugging material 47 may only be noted. When the firing contraction ratio of the plugging material 47 exceeds 1, a gap is sometimes generated between the plugging material and the partition wall of the honeycomb structure 50. When the firing contraction ratio of the plugging material 47 is less than 1, a force acts in such a direction to push and break the honeycomb structure 50. Therefore, the firing contraction ratio of the plugging material 47 for use in the method of manufacturing the plugged honeycomb structure in the present embodiment exists in an appropriate tolerable vertical range centering on 1. Since this range changes with a size or a cell structure of the plugged honeycomb structure 1 (see FIG. 1(b)) and a depth of the plugging material 47, the range is preferably appropriately selected every time. The firing contraction ratio of the plugging material 47 is set to be preferably less than 1, that is, an expansion system is constituted.

It is to be noted that there is not any special restriction on a type of firing setter 49, an a conventional known firing setter is usable, but in the plugged honeycomb structure of the present embodiment, it is preferable to use the firing setter 49 constituted of the same material as that of the honeycomb formed body 41.

In the method of manufacturing the plugged honeycomb structure in the present embodiment, the honeycomb structure 50 may be cut and divided into a predetermined length before plugging the predetermined cells 43a of the resultant honeycomb structure 50.

It is to be noted that in the method of manufacturing the plugged honeycomb structure of the present embodiment, the methods described in the embodiment of the first invention are preferably usable in a method of preparing the clay, a method of forming the honeycomb formed body, a method of disposing the plugging members, a method of firing the honeycomb formed body or the plugged honeycomb precursor and the like.

As described above, according to the method of manufacturing the plugged honeycomb structure of the present embodiment, as shown in FIG. 1(b), there can be easily manufactured the plugged honeycomb structure 1 capable of avoiding a phenomenon in which rapid increases of pressure losses are caused by the openings of the cells 3 clogged with the particulate matters on an inlet side.

The method of manufacturing the plugged honeycomb structure of the present embodiment may be performed by, for example, the following method. First, there is formed a honeycomb formed body which is longer than the targeted plugged honeycomb structure in an axial direction. Specifically, for example, there is formed a honeycomb formed body whose length is twice or more the length of the targeted plugged honeycomb structure in the axial direction.

Next, the resultant honeycomb formed body is fired to obtain the honeycomb structure. On the other hand, the plugging material constituting the plugging member is prepared so that the firing contraction ratio of the plugging material indicates the predetermined ratio with respect to that of the honeycomb structure. It is to be noted that a method of forming the honeycomb formed body, a method of firing the honeycomb formed body, and a method of preparing the plugging material can be realized in conformity to the methods described in the above-described embodiment.

Next, the openings of the cells of the resultant honeycomb structure are alternately plugged using the plugging material to obtain the plugged honeycomb precursor. The openings of a part of the cells are plugged in the opposite ends of the plugged honeycomb precursor.

Moreover, after firing the resultant plugged honeycomb precursor again, the precursor is cut in a direction perpendicular to a central axis of the honeycomb structure. In this manner, the plugged honeycomb structure can be manufactured which is provided with: the cylindrical honeycomb structure having the porous partition walls and a plurality of cells partitioned by the partition walls and extending through the structure from one end to the other end thereof; and the plugging members which plug the portions (end portions) of the predetermined cells having the predetermined length from one end of each cell, the opposite ends of the remaining cells being opened without being plugged. According to this manufacturing method, since two plugged honeycomb structures can be manufactured in one manufacturing process, manufacturing costs can be reduced.

Figure 8:
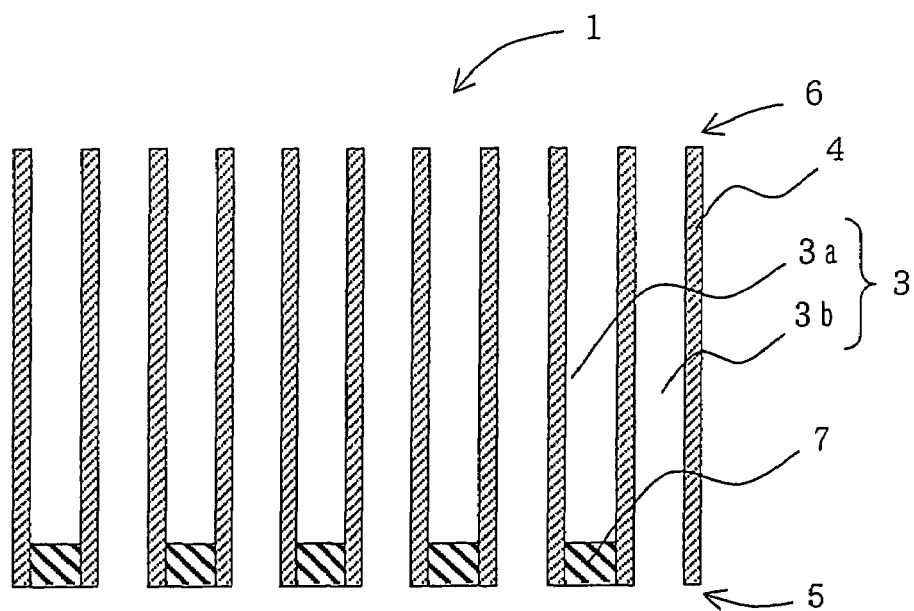
FIG. 8 is a schematic sectional view schematically showing a section of a plugged honeycomb structure in the present invention (third invention).

Next, there will be described one embodiment of a plugged honeycomb structure in the present invention (third invention). The plugged honeycomb structure of the present embodiment can be manufactured by the above-described embodiments of the first and second inventions. FIG. 8 is a schematic sectional view schematically showing a section of the plugged honeycomb structure in the present embodiment. As shown in FIG. 8, a plugged honeycomb structure 1 includes: a cylindrical honeycomb structure 4 having porous partition walls 2 and a plurality of partitioned cells 3 extending through the structure from one end 5 to the other end 6; and plugging members 7 which plug portions (end portions) of predetermined cells 3a having a predetermined length from one end 5 of each cell. The opposite ends 5, 6 of the remaining cells 3b being open without being plugged. The plugged honeycomb structure is constituted so that a ratio (length/outer diameter) of a length of the cylindrical honeycomb structure 4 in an axial direction with respect to the outer diameter of the cylindrical honeycomb structure 4 is in a range of 0.1 to 0.8.

As described above, the plugged honeycomb structure 1 of the present embodiment has an advantage that pressure losses can be reduced more than before owing to the presence of the cells 3b whose opposite ends 5, 6 are opened without being plugged. This structure is useful in an application in which a trapping efficiency of a single filter unit is not very strictly required in a case where the structure is used as the filter. As to solid matters such as ash and iron oxide that remain without disappearing after burning and removing particulate matters deposited in the plugged honeycomb structure 1, the solid matters remaining in the cells 3b opened without plugging the opposite ends 5, 6 are discharged to the outside by means of pressure of a gas passed through the cells 3b. Therefore, the cells 3 are not easily clogged with the solid matters. Especially in a conventional plugged honeycomb structure in which either of the end portions of each cell is plugged with the plugging member, in order to increase a filtering area of the partition wall and reduce the pressure losses, the ratio (length/outer diameter) of the length of the honeycomb structure in the axial direction with respect to the outer diameter of the honeycomb structure is set to 0.9 or more. It has been difficult to set the ratio (length/outer diameter) of the length of the honeycomb structure 4 in the axial direction with respect to the outer diameter of the cylindrical honeycomb structure 4 to 0.1 to 0.8. The plugged honeycomb structure of the present embodiment has a constitution provided with the cell 3a whose one end 5 is plugged and the cell 3b whose opposite end portions open without being plugged in a mixed state, and the pressure losses are essentially reduced. Therefore, even when the length in the axial direction is comparatively shortened, and the shape satisfying the above-described ratio (0.1 to 0.8) is constituted, the pressure losses do not largely drop.

It is to be noted that in the plugged honeycomb structure 1 of the present embodiment, the ratio (length/outer diameter) of the length of the honeycomb structure 4 in the axial direction with respect to the outer diameter of the cylindrical honeycomb structure 4 is in a range of preferably 0.1 to 0.6. According to such constitution, it is possible to comparatively reduce the length of the plugged honeycomb structure in the axial direction, and space saving can be further realized.

Moreover, in the plugged honeycomb structure of the present embodiment, a recessed portion may be formed in the surface of the plugging member, and hollows or voids may be formed in the plugging member. As described above in the embodiment of the first invention, the plugged honeycomb structure of the present embodiment can be realized by forming a dent in the plugging material 17 constituting the plugging member 7 (see FIG. 8) or forming the hollow or the void in the plugging material 17 as shown in, for example, FIGS. 5(a) to 5(l).

EXAMPLES

The present invention will be described hereinafter more specifically in accordance with examples, but the present invention is not limited to these examples.

Examples 1 to 13

First, as a forming material of a cordierite-like ceramic, a talc was formed into a honeycomb shape, which contained: 0 to 20% by mass of kaolin ($Al_2O_3.2SiO_2.2H_2O$) having an average particle diameter of 5 to 10 μm; 37 to 40% by mass of talc ($3MgO.4SiO_2H_2O$) having an average particle diameter of 15 to 30 μm; 15 to 45% by mass of aluminum hydroxide having an average particle diameter of 1 to 10 μm; 0 to 15% by mass of aluminum oxide having an average particle diameter of 4 to 8 μm; and 10 to 20% by mass of molten silica or quartz having an average particle diameter of 3 to 100 μm. Accordingly, a cylindrical honeycomb formed body was obtained in which a plurality of cells were partitioned to extend through the formed body from one end to the other end thereof.

On the other hand, a plugging material constituting a plugging member of the plugged honeycomb structure was prepared so that a firing contraction ratio of the plugging material indicated a predetermined ratio (0.7 to 1.3 in the present example) with respect to that of the honeycomb formed body. Main components of the plugging member were: 0 to 20% by mass of kaolin having an average particle diameter of 1 to 20 μm; 37 to 40% by mass of talc having an average particle diameter of 5 to 60 μm; 15 to 45% by mass of aluminum hydroxide having an average particle diameter of 0.5 to 20 μm; 0 to 15% by mass of aluminum oxide having an average particle diameter of 1 to 20 μm; and 10 to 20% by mass of molten silica or quartz having an average particle diameter of 1 to 200 μm. Blend ratios and raw material particle diameters of these components were appropriately changed so that the firing contraction ratio of the plugging member indicated a predetermined ratio with respect to that of the honeycomb formed body. In the present example, the ratio of the firing contraction ratio of the plugging member with respect to that of the honeycomb structure was set to about 1.10.

Next, openings of predetermined cells of the resultant honeycomb formed body on one-end side were plugged with the plugging material to obtain a plugged honeycomb formed body, and the resultant plugged honeycomb formed body was fired in a state in which the formed body was disposed so that each end plugged with the plugging material came into contact with the firing setter to manufacture the plugged honeycomb structure. The firing was performed at a temperature of 1410 to 1440° C. for about five hours.

As to the honeycomb structures constituting the plugged honeycomb structures (Examples 1 to 13) manufactured by such method of manufacturing the plugged honeycomb structure, porosities, average pore diameters, diameters of the ends, lengths in the axial direction, thicknesses (rib thicknesses) of the partition walls, and cell densities are shown in Tables 1 and 2. When an average thermal expansion coefficient at 40 to 800° C. was measured as to the resultant plugged honeycomb structures, each honeycomb structure constituting the plugged honeycomb structure indicated $0.6 \times 10^{-6}/°$ C. as an average value, and the plugging member indicated $0.8 \times 10^{-6}/°$ C. as an average value. A trapping efficiency was measured in a case where each plugged honeycomb structure was used as a filter. Results are shown in Tables 1 and 2.

TABLE 1

|  | Porosity [%] | Average pore diameter [μm] | Partition wall thickness [mm] | Cell density [cells/mm²] | Diameter of end [mm] | Length in axial direction [mm] | Trapping efficiency [%] |
|---|---|---|---|---|---|---|---|
| Example 1 | 61 | 24 | 0.30 | 46.5 (300 cells/square inch) | 191 | 90 | 46 |
| Example 2 | 52 | 13 | 0.30 | 46.5 (300 cells/square inch) | 229 | 80 | 39 |
| Example 3 | 49 | 11 | 0.42 | 15.5 (100 cells/square inch) | 143 | 152 | 36 |
| Example 4 | 48 | 12 | 0.64 | 15.5 (100 cells/square inch) | 143 | 152 | 38 |
| Example 5 | 64 | 22 | 0.30 | 43.4 (280 cells/square inch) | 143 | 152 | 53 |
| Example 6 | 65 | 23 | 0.24 | 54.3 (350 cells/square inch) | 143 | 152 | 58 |
| Example 7 | 65 | 23 | 0.20 | 62.0 (400 cells/square inch) | 143 | 152 | 63 |
| Example 8 | 71 | 14 | 0.20 | 62.0 (400 cells/square inch) | 143 | 152 | 70 |
| Example 9 | 71 | 14 | 0.20 | 62.0 (400 cells/square inch) | 143 | 70 | 56 |

TABLE 2

|  | Porosity [%] | Average pore diameter [μm] | Partition wall thickness [mm] | Cell density [cells/mm²] | Diameter of end [mm] | Length in axial direction [mm] | Trapping efficiency [%] |
|---|---|---|---|---|---|---|---|
| Example 10 | 76 | 9 | 0.20 | 69.8 (450 cells/square inch) | 143 | 152 | 74 |
| Example 11 | 78 | 8 | 0.20 | 77.5 (500 cells/square inch) | 143 | 152 | 77 |
| Example 12 | 83 | 6 | 0.15 | 93.0 (600 cells/square inch) | 143 | 152 | 79 |
| Example 13 | 83 | 6 | 0.10 | 93.0 (600 cells/square inch) | 143 | 152 | 82 |

A method of manufacturing a plugged honeycomb structure in the present invention is a method for simply manufacturing a plugged honeycomb structure capable of avoiding a phenomenon of rapid increase of pressure losses generated by cell openings clogged with particulate matters on an inlet side. In a plugged honeycomb structure of the present invention, pressure losses are reduced, and clogging with a solid content which does not disappear during burning of ash, iron oxide or the like is effectively prevented. The structure is preferably usable as a filter or the like which purifies an exhaust gas discharged from a diesel engine, a gasoline lean burn engine, or a gasoline direct jet engine.

What is claimed is:

1. A method of manufacturing a plugged honeycomb structure, the plugged honeycomb structure comprising:

a cylindrical honeycomb structure having a first end, a second end that is opposite to the first end, porous partition walls and a plurality of cells partitioned by the partition walls, the partition walls and the cells extending through the cylindrical honeycomb structure from the first end to the second end, and plugging members which plug portions of predetermined cells in such a way that the predetermined cells are plugged only at the first end and not plugged at the second end, the remaining cells are not plugged at any position between the first and the second end, the plugging members having a predetermined length from the first end of each of the predetermined cells, wherein the plugged honeycomb structure is in a casing inside an exhaust structure, the method comprising the steps of:

forming a clay including a forming material into a honeycomb shape to obtain a cylindrical honeycomb formed body having a plurality of partitioned cells extending through the formed body from the first end to the second end;

preparing a plugging material of the plugging members so that a contraction ratio (firing contraction ratio) of the plugging material during firing is a predetermined ratio with respect to the firing contraction ratio of the honeycomb formed body;

plugging openings of the predetermined cells of the resultant honeycomb formed body only at the first end with the plugging material to obtain a plugged honeycomb formed body; and firing the resultant plugged honeycomb formed body in a state in which the plugged honeycomb formed body is laid on a firing setter so as to bring the first end plugged with the plugging material into contact with the firing setter to thereby obtain the plugged honeycomb structure.

2. The method of manufacturing the plugged honeycomb structure according to claim 1, wherein the plugging material is prepared so that the ratio of the firing contraction ratio of the plugging material with respect to the firing contraction ratio of the honeycomb formed body is in a range of 0.70 to 1.30.

3. The method of manufacturing the plugged honeycomb structure according to claim 1, wherein the honeycomb formed body is cut and divided into a predetermined length, before plugging the predetermined cells of the honeycomb formed body.

4. A method of manufacturing a plugged honeycomb structure,
the plugged honeycomb structure comprising:
a cylindrical honeycomb structure having a first end, a second end that is opposite to the first end, porous partition walls and a plurality of cells partitioned by the partition walls, the partition walls and the cells extending through the cylindrical honeycomb structure from the first end to the second end, and
plugging members which plug portions of predetermined cells in such a way that the predetermined cells are plugged only at the first end and not plunged at the second end, the remaining cells are not plugged at any position between the first and the second end, the plugging members having a predetermined length from file first end of each of the predetermined cells,
wherein the plugged honeycomb structure is in a casing inside an exhaust structure,
the method comprising the steps of:
forming a clay including a forming material into a honeycomb shape to obtain a cylindrical honeycomb formed body having a plurality of partitioned cells extending through the formed body from the first end to the second end;
firing the resultant honeycomb formed body to obtain the honeycomb structure;
preparing a plugging material of the plugging members so that a contraction ratio (firing contraction ratio) of the plugging material during firing is a predetermined ratio with respect to the firing contraction ratio of the honeycomb structure;
plugging openings of the predetermined cells of the resultant honeycomb structure only at the first end with the plugging material to obtain a plugged honeycomb precursor; and
firing the resultant plugged honeycomb precursor in a state in which the plugged honeycomb precursor is laid on a firing setter so as to bring the first end plugged with the plugging material into contact with the firing setter to thereby obtain the plugged honeycomb structure.

5. The method of manufacturing the plugged honeycomb structure according to claim 4, wherein the plugging material is prepared so that the ratio of the firing contraction ratio of the plugging material with respect to the firing contraction ratio of the honeycomb structure is in a range of 0.70 to 1.30.

6. The method of manufacturing the plugged honeycomb structure according to claim 4, wherein the honeycomb structure is cut and divided into a predetermined length, before plugging the predetermined cells of the honeycomb structure.

7. The method of manufacturing the plugged honeycomb structure according to claim 1, wherein the firing setter is used which is constituted of the same material as that of the honeycomb formed body.

8. The method of manufacturing the plugged honeycomb structure according to claim 4, wherein the firing setter is used which is constituted of the same material as that of the honeycomb formed body.

9. The method of manufacturing the plugged honeycomb structure according to claim 1, wherein the honeycomb formed body is formed so that a ratio (length/outer diameter) of a length of the honeycomb formed body in an axial direction with respect to the outer diameter of the honeycomb formed body is in a range of 0.1 to 0.8.

10. The method of manufacturing the plugged honeycomb structure according to claim 4, wherein the honeycomb formed body is formed so that a ratio (length/outer diameter) of a length of the honeycomb formed body in an axial direction with respect to the outer diameter of the honeycomb formed body is in a range of 0.1 to 0.8.

11. A plugged honeycomb structure comprising:
a cylindrical honeycomb structure having a first end, a second end that is opposite to the first end, porous partition walls and a plurality of partitioned cells, the partition walls and the cells extending through the cylindrical honeycomb structure from the first end to the second end; and
plugging members which plug portions of predetermined cells in such a way that the predetermined cells are plugged only at the first end and not plugged at the second end, the remaining cells are not plugged at any position between the first and the second end, the plugging members having a predetermined length from the first end of each of the predetermined cells,
wherein the plunged honeycomb structure is in a casing inside an exhaust structure,
the plugged honeycomb structure being constituted so that a ratio (length/outer diameter) of a length of the honeycomb structure in an axial direction with respect to the outer diameter of the cylindrical honeycomb structure is in a range of 0.1 to 0.8.

12. The plugged honeycomb structure according to claim 11, wherein the ratio of the length of the honeycomb structure in the axial direction with respect to the outer diameter of the cylindrical honeycomb structure is in a range of 0.1 to 0.6.

13. The plugged honeycomb structure according to claim 11, wherein a recessed portion is formed in the surface of the plugging member.

* * * * *